US007841578B2

(12) United States Patent
Ishigaki

(10) Patent No.: US 7,841,578 B2
(45) Date of Patent: Nov. 30, 2010

(54) VACUUM VALVE

(75) Inventor: Tsuneo Ishigaki, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 921 days.

(21) Appl. No.: 11/690,354

(22) Filed: Mar. 23, 2007

(65) Prior Publication Data
US 2007/0231166 A1    Oct. 4, 2007

(30) Foreign Application Priority Data
Mar. 31, 2006   (JP)   ............................. 2006-099765

(51) Int. Cl.
*F16K 31/00* (2006.01)
(52) U.S. Cl. ..................... 251/63.6; 251/335.3; 251/366
(58) Field of Classification Search ............. 251/335.3, 251/367, 366, 63.5, 63.6, 324; 137/341
See application file for complete search history.

(56) References Cited

U.S. PATENT DOCUMENTS

| | | | | |
|---|---|---|---|---|
| 4,070,001 A * | 1/1978 | Musgrove | ..................... | 251/46 |
| 5,174,335 A * | 12/1992 | Iwabuchi | ..................... | 251/28 |
| 5,651,528 A * | 7/1997 | Frei et al. | ..................... | 251/54 |
| 5,678,595 A * | 10/1997 | Iwabuchi | ..................... | 251/63.5 |
| 6,491,059 B2 * | 12/2002 | Kajitani | ..................... | 251/63.6 |
| 6,494,229 B2 * | 12/2002 | Kajitani | ..................... | 251/63.6 |
| 6,508,268 B1 * | 1/2003 | Kouketsu | ..................... | 251/335.2 |
| 6,668,854 B2 * | 12/2003 | Fukuda | ..................... | 251/63.5 |
| 6,708,721 B2 * | 3/2004 | Fukuda et al. | ..................... | 251/63.5 |
| 6,748,969 B2 * | 6/2004 | Kanzaka et al. | ..................... | 251/63.5 |
| 6,772,989 B2 * | 8/2004 | Enzaki et al. | ..................... | 251/63.5 |
| 6,805,152 B2 * | 10/2004 | Kanzaka et al. | ..................... | 251/63.5 |

FOREIGN PATENT DOCUMENTS

JP    3032708    2/2000

* cited by examiner

*Primary Examiner*—John K Fristoe, Jr.
*Assistant Examiner*—Andrew J. Rost
(74) *Attorney, Agent, or Firm*—Oblon, Spivak, McClelland, Maier & Neustadt, L.L.P.

(57) ABSTRACT

In a vacuum valve composed of a main valve portion that opens and closes a vale seat in a flow path connecting two ports by a valve member, and an operating portion that performs an opening and closing operation for the valve member, the housing of the main valve portion is assembled by joining the two port members with a cylindrically shaped housing main body formed by a squeezing process for a plate material made of metal, or a ring-shaped material made of the metal. In an end portion of the housing, a flange-shaped attaching portion that is bent inward is formed. The operating portion is attached onto the attaching portion via a ring-shaped supporting seat member. A sealing member is sandwiched between a ring-shaped supporting plate and the attaching portion. Both ends of a bellows are respectively connected to the supporting plate and the valve member.

12 Claims, 10 Drawing Sheets

(a)

(b)

(c)

VACUUM VALVE

TECHNICAL FIELD

The present invention relates to a vacuum valve for discharging gas in a vacuum chamber with a vacuum pump, which is used for manufacturing a semiconductor or the like, and more concretely, to a vacuum valve provided with a housing which is formed by a press-drawing process or a spinning process.

BACKGROUND ART

Hitherto, a housing of a vacuum valve formed to have approximately uniform wall thickness by a squeezing process for one pipe material is heretofore known by, for example, Japanese Examined Patent Application Publication No. 3032708. The vacuum valve is provided with a valve seat formed into a flat surface shape by a squeezing process and a valve member for opening and closing the valve seat inside the housing having a cylindrical shape. An operating portion (cylinder portion) for opening and closing the valve member is attached to an upper end portion of the housing.

As described above, when the housing of the vacuum valve is formed by a drawing process for pipe material, the housing can be manufactured with simple and inexpensive manner. This is because there is no need to perform an expensive and complicated machine work. In addition, this is effective for a weight saving for the vacuum valve because the housing can be formed to have a thin wall thickness.

However, at the same time, the thin-walled housing causes an attaching operation for the operating portion to be difficult. As a matter of fact, in the heretofore known vacuum valve, an annular supporting member is attached to the upper end portion of the housing, while utilizing the wall thickness of the housing without modification, and the operating portion is attached onto the supporting member. Alternatively, an adaptor combined with the operating portion is directly attached onto the upper end portion of a cylinder. However, such a method, in which the operating portion is attached while utilizing the small wall thickness of the housing without modification, tends to not only result in small attaching strength, but also result in growing in size of the vacuum valve. This is because the supporting member overhangs to an outer periphery of the housing at large amount.

DISCLOSURE OF INVENTION

Accordingly, an object of the present invention is to enable an attaching operation for an operating portion to a housing, in a valve including the housing formed by performing a drawing process for a metallic material with a simple construction as compact as possible without resulting in reducing a strength.

So as to solve the above-described problems, a vacuum valve of the present invention is constructed with two ports connected to a vacuum chamber and a vacuum source, a valve seat formed in a halfway of a flow path connecting the ports, a main valve portion including a poppet-type valve member for opening and closing the valve seat, and an operating portion for performing an opening and closing operation for the valve member.

A housing of the main valve portion includes a cylindrically shaped housing main body having a uniform thickness formed by performing a press-drawing process or a spinning process for a plate material made of metal, or a ring-shaped material made of metal, and cylindrically shaped two port members forming the ports, and the housing of the main valve portion is assembled by joining each of the port members with an opening portion for a port, formed at each of a first end in an axis line direction of the housing main body and a side surface thereof. Further, at a second end in the axis line direction of the housing main body, a flange-shaped attaching portion having a uniform thickness is formed by inwardly bending the end portion of the housing main body. Furthermore, a supporting seat member provided with a round inner hole having a diameter greater than an inner diameter of the attaching portion is attached onto the attaching portion, and the operating portion is attached onto the supporting seat member. Moreover, a ring-shaped sealing member and a ring shaped supporting plate are sandwiched between the attaching portion and the operating portion in an inner hole of the supporting seat member, and both ends of a bellows are respectively connected to the supporting plate and the valve member.

In the present invention, it is preferable that the supporting seat member is fixed by joining the same with the attaching portion, and a plurality of female screws are formed in the supporting seat member, and that the operating portion is attached to the supporting seat member by screwing a screw rod provided in the operating portion into each of the female screws.

Further, preferably, the supporting plate is formed from an anticorrosion metallic material as the same as the housing.

In the present invention, the supporting seat member may be formed from a main body portion to be mounted on an upper surface of the attaching portion, and a skirt portion extending out from an outer peripheral end of the main body portion to a housing side, and surrounding an outer periphery of the housing. Alternatively, the supporting seat member may have a groove-shaped cross-sectional shape, and is attached onto the attaching portion in a condition that an opening edge of the groove is in contact with the attaching portion.

In the present invention, it is possible that a jacket for transmitting heat is adhered to an outer surface of the housing of the main valve portion. In this case, the jacket and the supporting seat member are possible to be integrally formed.

Further, according to the present invention, a housing for use in a main valve portion in a vacuum valve is provided. The housing includes a cylindrically shaped housing main body having a uniform thickness formed by performing a press-drawing process or a spinning process for a plate material made of metal, or a ring-shaped material made of metal, and cylindrically shaped two port members forming the two ports. The housing is assembled by joining each of the two port members with an opening portion for a port, formed at each of a first end in an axis line direction of the housing main body and a side surface thereof. At a second end in the axis line direction of the housing main body, a flange-shaped attaching portion having a uniform thickness for attaching the operating portion is formed by inwardly bending an end portion of the housing main body.

In the housing main body, it is preferable that a supporting seat member including a round inner hole having a diameter greater than an inner diameter of the attaching portion, and a plurality of female screws for attaching the operating portion is fixed onto the attaching portion by joining. In this case, preferably, the supporting seat member has a groove-shaped cross-sectional shape, and is fixed to the attaching portion in a condition that the opening edge of the groove is in contact with the attaching portion.

BEST MODE FOR CARRYING OUT THE INVENTION

Figure 1:
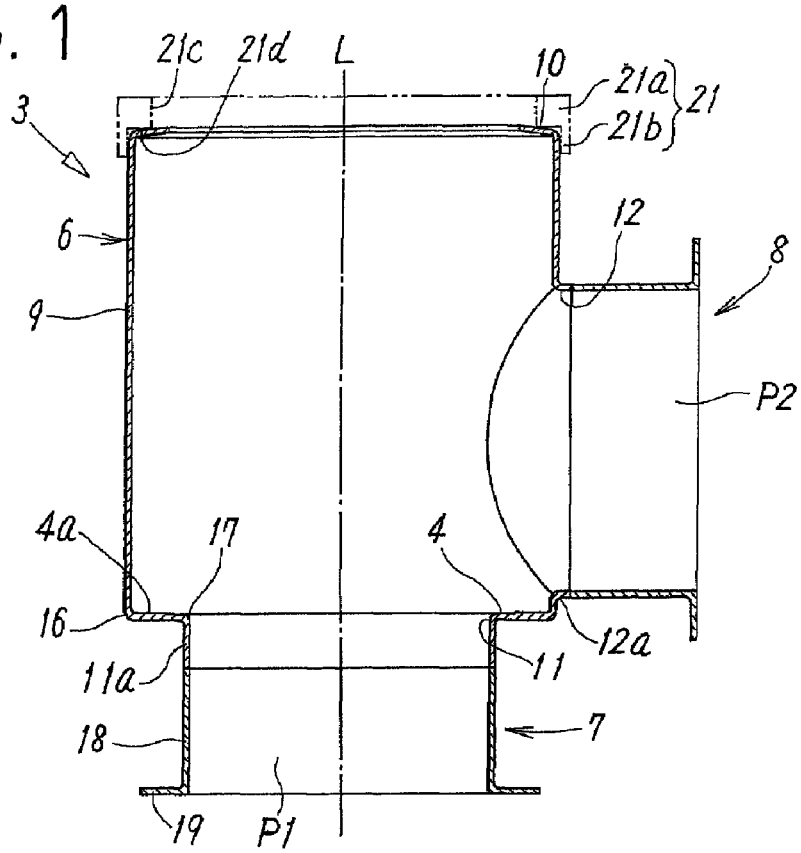
FIG. 1 is a cross-sectional view of an assembling condition illustrating a first constructional example of a housing of a vacuum valve according to the present invention.
Figure 5:
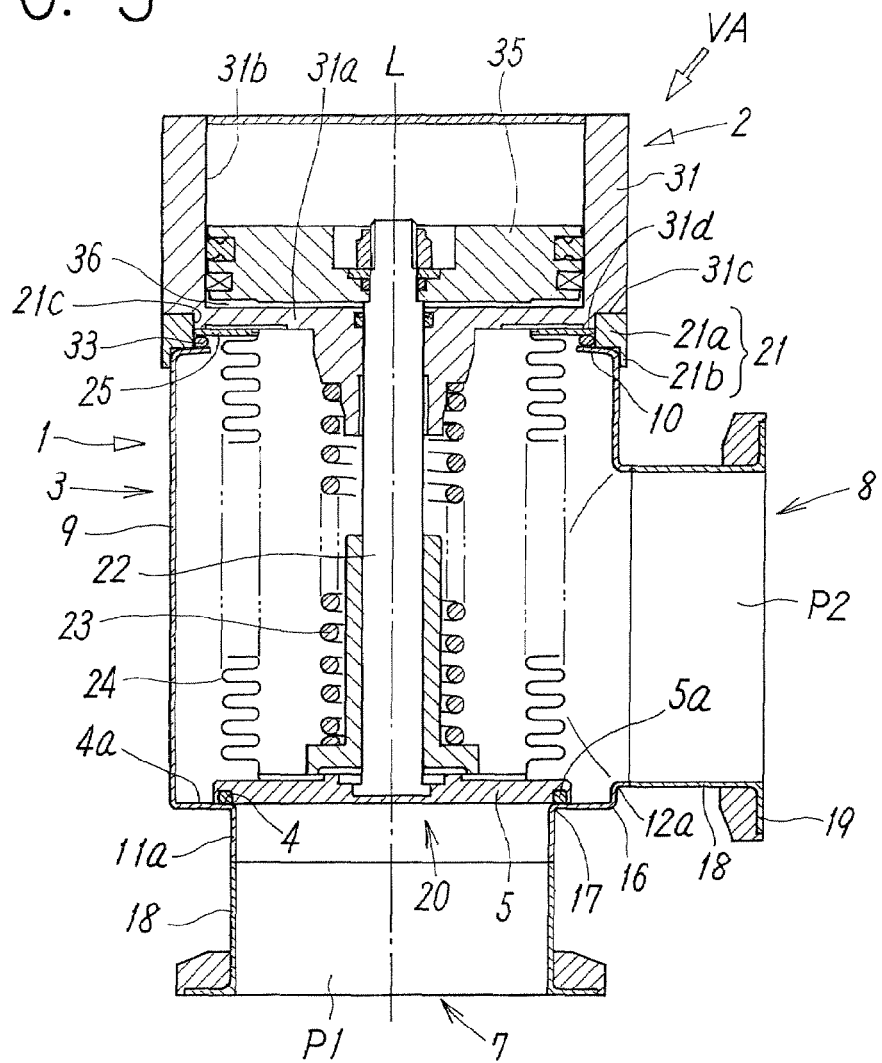
FIG. 5 is a cross-sectional view illustrating a first embodiment of the vacuum valve according to the present invention.
Figure 8:
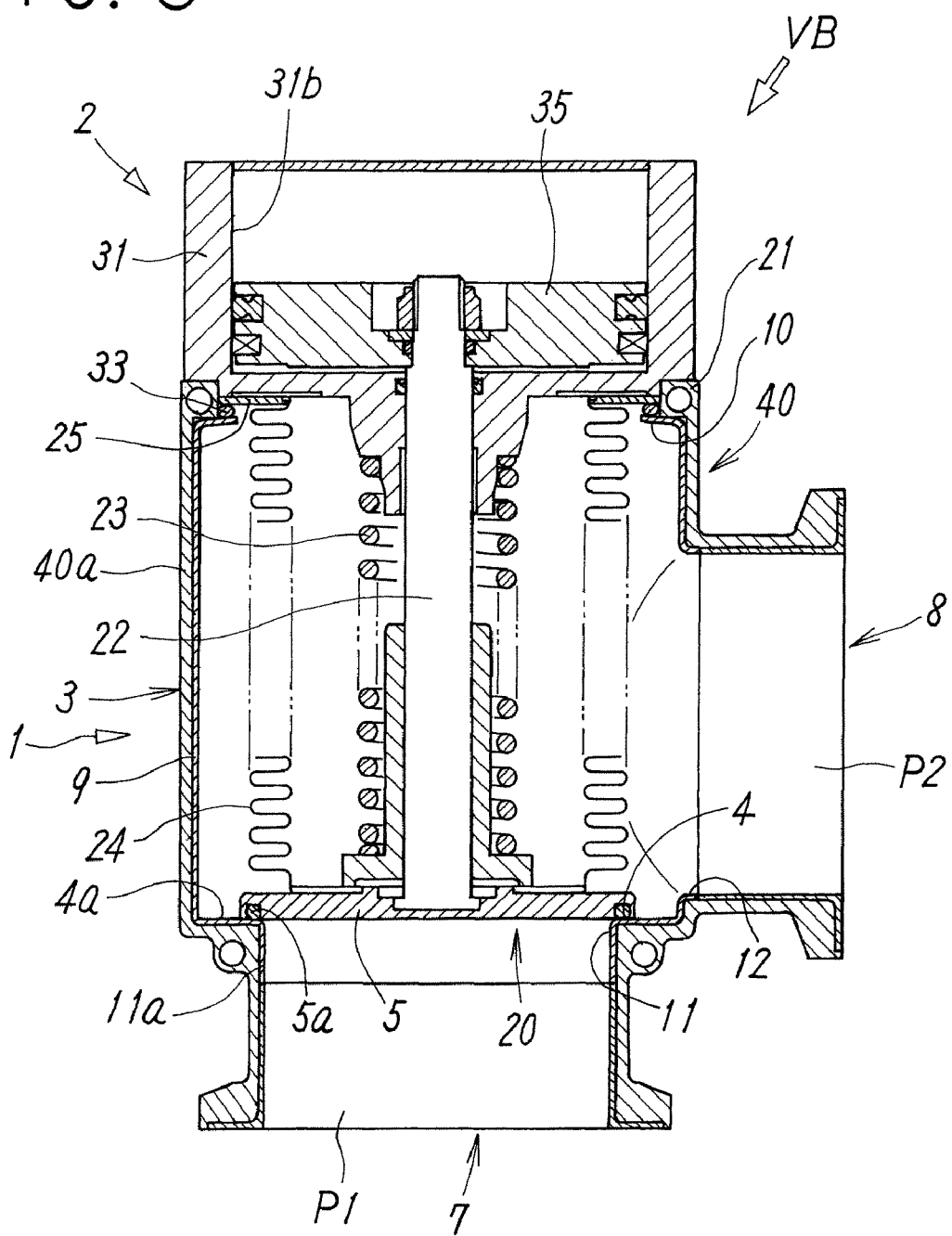
FIG. 8 is a cross-sectional view illustrating a second embodiment of the vacuum valve according to the present invention.

In FIG. 1, a first constructional example of a housing for use in a main valve portion in a vacuum valve is illustrated. A housing 3 is used for a main valve portion 1 of a vacuum valve VA or a vacuum valve VB as shown in FIG. 5 or FIG. 8. The vacuum valve VA or VB is constructed by combining the main valve portion 1 provided with two of first and second ports P1 and P2 which are respectively connected to a vacuum chamber and a vacuum source, a valve seat 4 formed in a halfway of a flow path connecting the ports P1 and P2, and a poppet-type valve member 5 contacting and separating from the valve seat 4 for opening and closing the flow path, with an operating portion 2 constructed with a fluid pressure cylinder for opening and closing the valve member 5. The details of the construction of the valves VA or VB will be described later.

Figure 2:
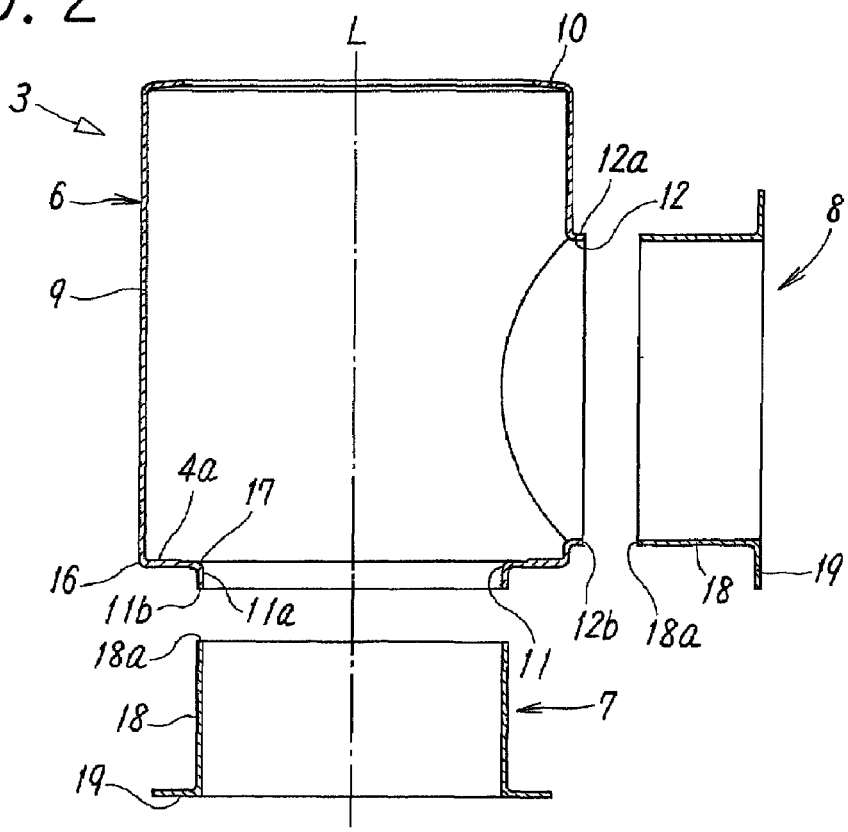
FIG. 2 is a cross-sectional view illustrating a condition before the housing in FIG. 1 is assembled.

The housing 3 is, as is also clear from FIG. 2, composed of a cylindrically shaped housing main body 6 having a uniform thickness formed by performing a press-drawing process or a spinning process for a metal sheet member or a metal pipe member made of stainless steel or the like, and two of a first and second port members 7 and 8 having a cylindrical shape, which forms the ports P1 and P2. The housing 3 is assembled by respectively joining the port members 7 and 8 with first and second opening portions 11 and 12 for forming ports, which are formed in the housing main body 6, with a method, such as welding, soldering, or the like, respectively, as shown in FIG. 1.

The housing main body 6 has a ring-shaped flat valve seat forming surface 4a in a direction orthogonal to an axis line L, which is formed by inwardly bending an end portion of the housing main body 6 by a pressing process or the like, at a first end in the direction of the axis line L of a cylindrical body portion 9 for movably housing the valve member 5. In addition, a first opening portion 11 for forming a first port P1 is formed at an inside of the valve seat forming surface 4a, and at a position near an inner peripheral end of the valve seat forming surface 4a, the ring-shaped valve seat 4 surrounding the first opening portion 11 is formed. At the inner peripheral end of the valve seat forming surface 4a, namely at a mouth edge of the first opening portion 11, a cylindrically shaped connecting cylinder portion 11a for a port is formed by outwardly bending the mouth edge along the axis line L.

Further, at a side surface of the cylindrical body portion 9 in the housing main body 6, a second opening portion 12 for forming the second port P2 is formed. In addition, a cylindrically shaped connecting cylinder portion 12a for a port is formed by outwardly bending the mouth edge of the second opening portion 12.

Furthermore, at a second end in the direction of the axis line L in the housing main body 6, a flange-shaped attaching portion 10 having a uniform thickness is formed by inwardly bending the end portion of the housing main body 6. The attaching portion 10 is provided for attaching the operating portion 2, and is inclined so as for an inner periphery side thereof to face slantwise above in the illustrated example. However, the attaching portion 10 may be formed in a horizontal manner.

Figure 10:
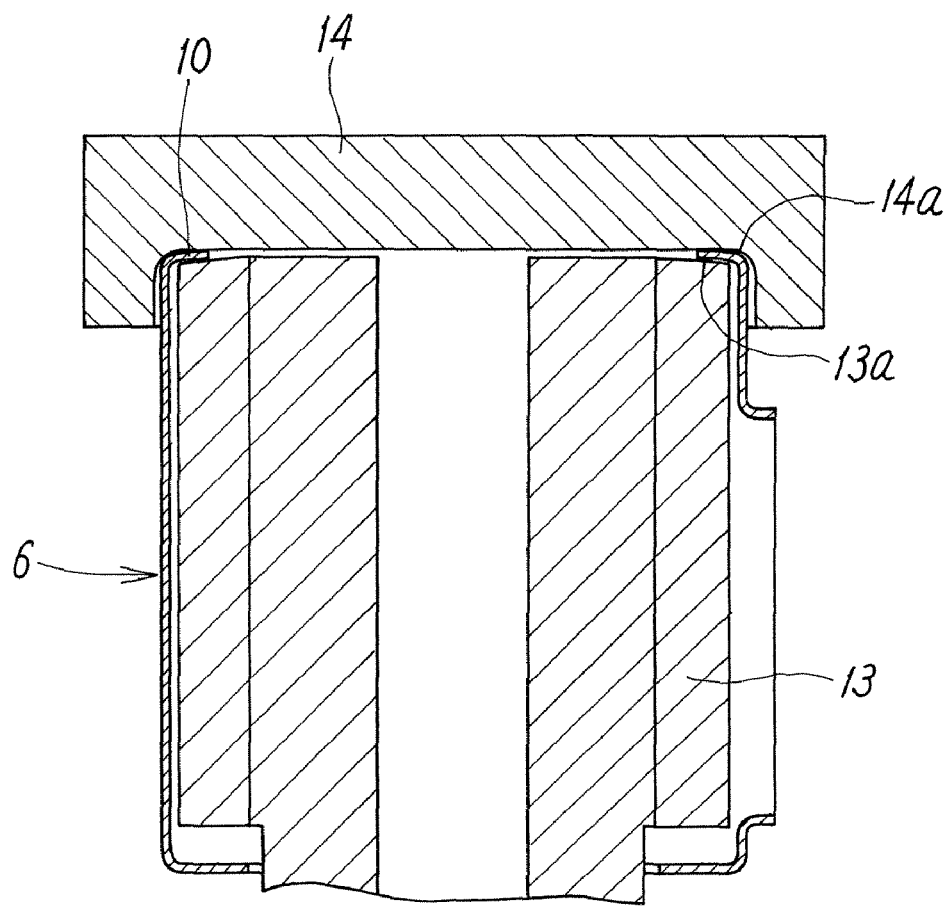
FIG. 10 is a main-part cross-sectional view illustrating an example of a method for forming an attaching portion.

The attaching portion 10 can be formed, for example, as shown in FIG. 10, by a method in which an upper end portion of the housing main body 6 is bent inward by pressurizing with a pressing mold 14 provided with a slanting surface 14a for bending, in a condition of inserting a receiving mold 13 provided with a receiving surface 13a for bending whose diameter is variable in small and large manner, at an outer periphery of a tip end portion of the receiving mold 13 inside the housing main body 6, and in which the receiving mold 13 is taken out while reducing the diameter thereof. Further, it is natural to say that the attaching portion 10 may be formed with a method other than the above-description.

The above-described housing 3 can be manufactured with a simple and inexpensive manner with a press-squeezing process or the like without performing an expensive machine work.

A curvature radius of an inside of a bent portion 16 where the cylindrical body portion 9 and the valve seat forming surface 4a in the housing main body 6 continue into each other, and a curvature radius of an inside of a bent portion 17 where the valve seat forming surface 4a and the connecting cylinder portion 11a continue into each other are preferable to be set closer to a minimum measure which is obtained by the pressing process. For example, in a case that the housing 3 is formed with a plate material made of stainless steel, and when a thickness of the plate material is defined as 1.5 mm, the curvature radius thereof is preferable to be 3 mm or less, and more preferably, to be about 2 mm.

Thus, when the curvature radius of the bent portion 17 is reduced, the valve seat 4 can be formed at a position near the inner peripheral end of the valve seat forming surface 4a, namely at a position near the first opening portion 11. Therefore, a diameter of the valve member 5 can be reduced by just that much, and as a result, a difference between an inner diameter of the housing 3 and the outer diameter of the valve member 5 can be increased. This results in increasing a flow path square measure when the valve is opened, and conductance can be increased even in a same valve stroke. Alternatively, an external shape of the housing 3 becomes possible to be reduced compared to an effective cross-sectional area in the housing 3 by reducing the diameter of the cylindrical body portion 9 of the housing 3 while increasing a diameter of the first opening portion 11.

The port members 7 and 8 are, as is clear from FIG. 1 and FIG. 2, provided with a cylindrical portion 18 having a flat joining surface 18a at a tip end thereof, and a flange portion 19 formed at a base end portion of the cylindrical portion 18. Further, the joining surfaces 18a are confronted to flat joining surfaces 11b and 12b at tip ends of respective connecting cylinder portions 11a and 12a, which are formed in the housing main body 6. The contacting portions of the joining surface 18a and the joining surfaces 11b and 12b are welded and thereby integrally joined with the housing main body 6. The port members 7 and 8 are formed by combining a pressing process, a forging, and so forth.

Incidentally, although two of the port members 7 and 8 have the same shape and the same measure from each other, the shape and the measure may be different from each other. When the measures of two port members 7 and 8 are different, measures of the connecting cylinder portions 11a and 12a are to be different corresponding thereto.

Figure 3:
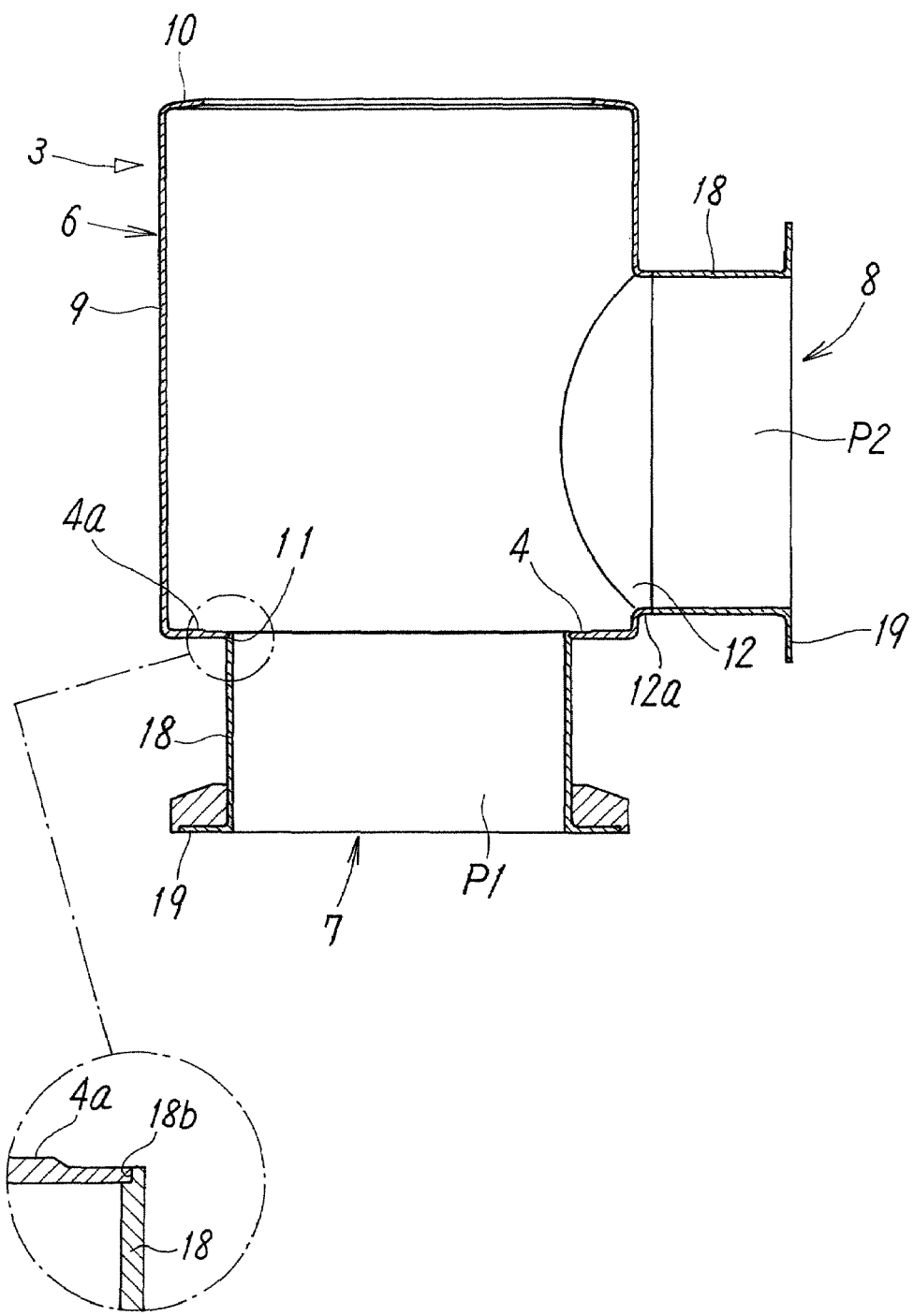
FIG. 3 is a cross-sectional view illustrating a second constructional example of the housing.

FIG. 3 illustrates a second constructional example of the housing 3. In the second constructional example, the cylindrically shaped connecting cylinder portion 11a as that shown in the first constructional example in FIG. 1 and FIG. 2 is not formed around the first opening portion 11 of the housing main body 6. A tip end portion of the cylindrical portion 18 of the port member 7 is joined with the mouth edge of the first opening portion 11 by welding thereto while being directly brought into contact therewith. Namely, as is clear from an enlarged view which is circled, a concave step portion 18b is formed at the tip end of the cylindrical portion 18, and a tip end of the valve seat forming surface 4a is brought into contact with the concave step portion 18b. The contacting portions thereof are then joined by welding the same. Accordingly, in this case, an angle formed by the valve seat forming surface 4a and the port member 7 approaches to a right angle than the angle of the first constructional example shown in FIG. 1.

Incidentally, since the construction of the housing 3 in the second constructional example other than the above description is not different from the housing 3 in the first constructional example, the same numerals are attached to the same elements and the explanation is omitted.

As described above, the housing 3 is composed of a housing main body 6, and two of the port members 7 and 8, and these members are joined at two places and integrally formed. In this case, when a wall thickness of the cylindrical portion 18 of the port members 7 and 8, and that of the connecting cylinder portions 11a and 12a of the housing main body 6 are configured to be approximately identical, the joining by various types of joining methods becomes enabled. However, it is desirable to perform a back-wave welding that the cylindrical portion 18 and the connecting cylinder portions 11a and 12a are joined by making the whole of contacting faces of the cylindrical portion 18 and the connecting cylinder portions 11a and 12a melt. In this case, there is no possibility that a corrosive substance intrudes because no minute gap is formed in a joining portion, and a corrosion resistance of the housing 3 can be improved.

Figure 4:
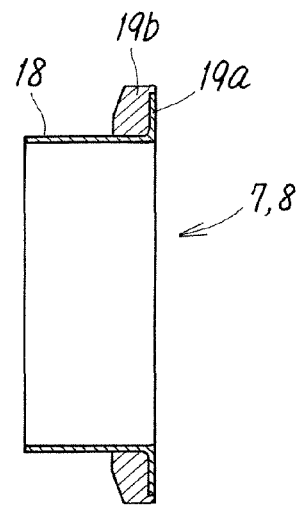
FIG. 4(a) through (c) is a cross-sectional view illustrating different constructional examples of a port member.
Figure 4:
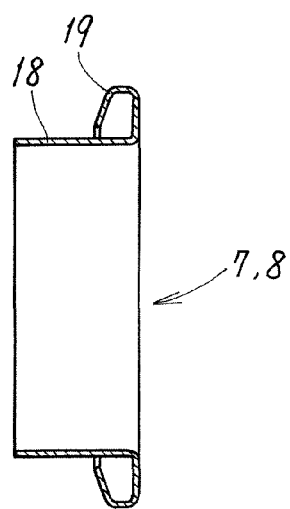
Figure 4:
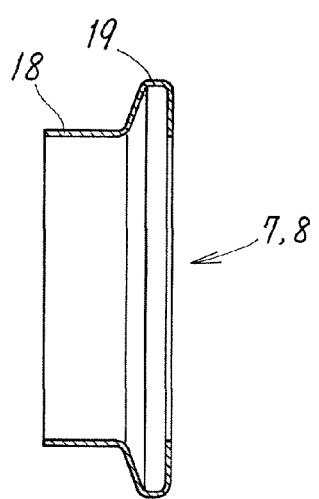

The flange portion 19 of the port members 7 and 8 can be constructed into various configurations as exemplarily shown in FIG. 4(a) through 4(c).

The flange portion 19 of each of the port members 7 and 8 shown in FIG. 4(a) is formed from a bent portion 19a which is formed by outwardly bending a base end portion of the cylindrical portion 18, and an auxiliary clasp 19b for a clamp being brought into contact with an inside of the bent portion 19a.

Further, the flange portion 19 of each of the port members 7 and 8 shown in FIG. 4(b) is formed into a hollow shape by bending a base end portion of the cylindrical portion 18 outward by pressing process or the like, then folding back the tip end thereof toward a tip end side of the cylindrical portion 18, and further bending the tip end thereof toward an outer surface of the cylindrical portion 18.

Furthermore, the flange portion 19 of the port members 7 and 8 shown in FIG. 4(c) is formed into a groove shape by bending the base end portion of the cylindrical portion 18 orthogonally outward by pressing process or the like, then folding back the tip end thereof in a cylindrical manner along an axis line of the flange portion 19, and further bending the tip end thereof toward a center side.

The flange portion 19 of each of the port members 7 and 8 in the FIGS. 4(b) and 4(c) is configured to have a hollow-shaped internal part and is therefore light-weighted.

Incidentally, the port members 7 and 8 may also be formed by a member of a cutting work.

Next, a vacuum valve VA using the housing 3 will be explained with reference to FIG. 5 and FIG. 6.

In the vacuum valve VA, the housing 3 for use in a main valve portion 1 is constructed by joining the port members 7 and 8 shown in FIG. 4(a) with each of the connecting cylinder portions 11a and 12a of the housing main body 6 in FIG. 2. Further, a valve mechanism 20 is built into inside of the housing 3, and the operating portion 2 constructed from a fluid pressure cylinder is attached to an upper part of the attaching portion 10 formed at an upper end of the cylindrical body portion 9 of the housing 3 via a supporting seat member 21.

The valve mechanism 20 is provided with the valve member 5 having a disk shape, and a ring-shaped sealing member 5a that contacts-and-separates from the valve seat 4 is attached to a lower surface of the valve member 5. Further, at a center position of an upper surface of the valve member 5, a lower end of a valve rod 22 extending along the axis line L of the housing 3 is attached, and an upper end portion of the valve rod 22 extends into an inner part of a cylinder housing 31 while penetrating through a bottom wall portion 31a of the cylinder housing 31 at the operating portion 2.

Furthermore, a spring 23 that biases the valve member 5 toward the valve seat 4 side intervenes between a lower surface of the bottom wall portion 31a and the valve member 5. Both ends of a bellows 24 are connected to a ring-shaped supporting plate 25 which is sandwiched and fixed together with a sealing member 33 between the bottom wall portion 31a and the attaching portion 10, and the upper surface of the valve member 5. The bellows 24 includes the valve rod 22, the spring 23, and a lower surface of the bottom wall portion 31a of the cylinder housing 31 inside thereof. Thereby, these members and portions are insulated from a corrosive controlling fluid flowing through a space between the first port P1 and the second port P2, and are prevented from being corroded.

Figure 6:
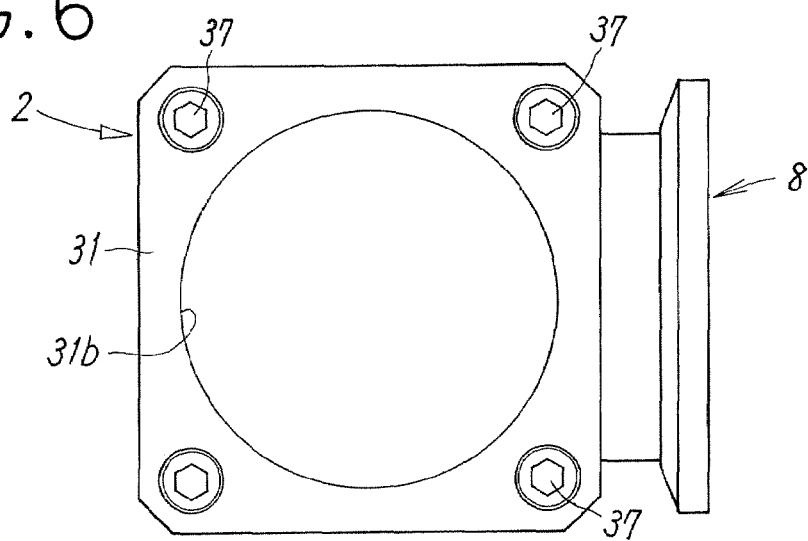
FIG. 6 is a plan view of FIG. 5.

On the other hand, as is clear from FIG. 6, the operating portion 2 is provided with the cylinder housing 31 having a rectangular external shape, a piston 35 is slidably housed inside a round cylinder hole 31b formed inside the cylinder housing 31, and an upper end of the valve rod 22 is attached to the piston 35. A pressure chamber 36 is formed between a lower surface of the piston 35 and the bottom wall portion 31a of the cylinder housing 31. The pressure chamber 36 is allowed to communicate with an operating port, not shown, and a pressurized fluid such as compressed air or the like is supplied to and discharged from the pressure chamber 36 through the operating port. Thereby, the piston 35 is driven and the valve member 5 contacts with and separates from the valve seat 4.

Figure 7:
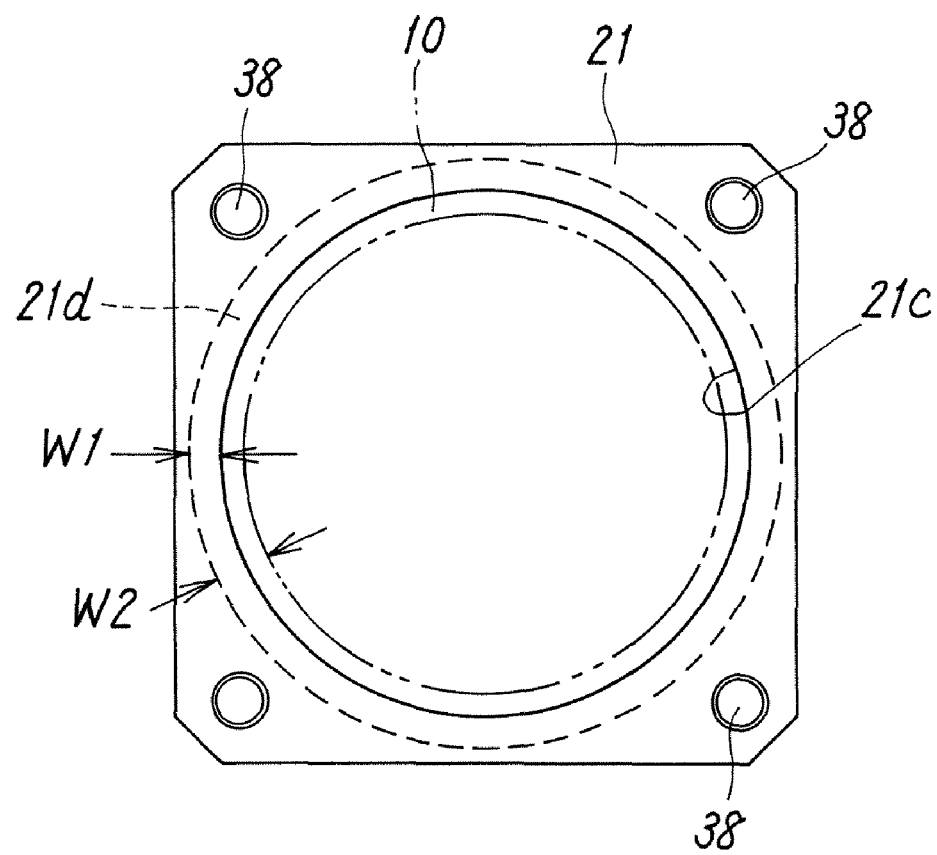
FIG. 7 is a plan view illustrating a supporting seat member.

The operating portion 2 is attached to the attaching portion 10 of the housing 3 for use in the main valve portion 1 by the supporting seat member 21. As is clear from FIG. 7, the supporting seat member 21 has a shape of a rectangular flat surface. The supporting seat member 21 is composed of a main body portion 21a having a rectangular cross-section, which is mounted on an upper surface of the attaching portion 10, and a skirt portion 21b extending from an outer peripheral end of the main body portion 21a toward a housing 3 side and surrounding an outer periphery of the upper end portion of the housing 3. The supporting seat member 21 is provided with a round inner hole 21c formed inside the main body portion 21a. A hole diameter of the inner hole 21c is configured to be greater than an inner diameter of the attaching portion 10 and smaller than an outer diameter thereof. Further, a width W1 in an inner and outer diameter direction, of a portion 21d of a lower surface of the main body portion 21a, to be in contact with or mounted on the upper surface of the attaching portion 10 is configured to be smaller than a width W2 in an inner and outer diameter direction, of the attaching portion 10 thereof. Accordingly, when the supporting seat member 21 is attached onto the attaching portion 10, a portion near an inner periphery of the attaching portion 10 extends toward an inner periphery side of the inner hole 21c of the supporting seat member 21.

Further, at positions of four corners of the supporting seat member 21, a plurality of female screws 38 for screwing a screw rod 37 for fixing the operating portion 2 are formed. The supporting seat member 21 is formed with metallic material of low corrosive stainless steel, ferrous series or non-ferrous series. As shown by a chained line in FIG. 1, the supporting seat member 21 is joined with and fixed to the attaching portion 10 by the method such as welding, soldering, or the like. In this case, ordinarily, this operation is performed at a stage of forming the housing 3.

On the other hand, at an outer periphery of a lower surface of the bottom wall portion 31a of the cylinder housing 31, a ring-shaped concave step portion 31c where the supporting seat member 21 is fitting is formed. In addition, a pressing portion 31d being in contact with the supporting plate 25 is formed at an inner peripheral portion of the concave step portion 31c.

Furthermore, at a position of an inner periphery side of the supporting seat member 21, namely in the inner hole 21c, the sealing member 33 is disposed on the attaching portion 10. In addition, the supporting plate 25 is disposed in a manner so as to sandwich the sealing member 33 with the attaching portion 10 in-between, and the operating portion 2 is disposed thereupon, and further, the screw rod 37 is screwed into the female screw 38 of the supporting seat member 21. Thereby, the operating portion 2 is combined with the main valve portion 1. Currently, the supporting plate 25 is brought into contact with the pressing portion 31d of the cylinder housing 31, and is pressed downward. Thereby, the sealing member 33 is sandwiched between the supporting plate 25 and the attaching portion 10. Moreover, at a position near an inner peripheral end of the supporting plate 25, an upper end portion of the bellows 24 is connected.

By this construction, the valve rod 22, the spring 23, and the lower surface of the bottom wall portion 31a of the cylinder housing 31 are included inside the bellows 24. This turns out that the bellows 24 itself, the housing 3 positioned outside the bellows 24, the sealing member 33, and the supporting plate 25 are in contact with the corrosive controlling fluid flowing through both the space between the ports P1 and P2. Therefore, the bellows 24 and the supporting plate 25 are formed from an anticorrosion metallic material, such as stainless steel or the like similarly to the material of the housing 3.

At the same time, it is possible to form the supporting seat member 21 and the cylinder housing 31 with an inexpensive material not specifically having the resistance to corrosion.

Further, the above-described construction where the operating portion 2 is attached to the attaching portion 10 facing inward, which is formed at an upper end of the housing 3 via the supporting seat member 21, enables to combine the operating portion 2 provided with a cylinder housing 31 having a diameter approximately the same as that of the housing 3 or less. This is extremely effective to aim at miniaturizing the vacuum valve.

Figure 9:
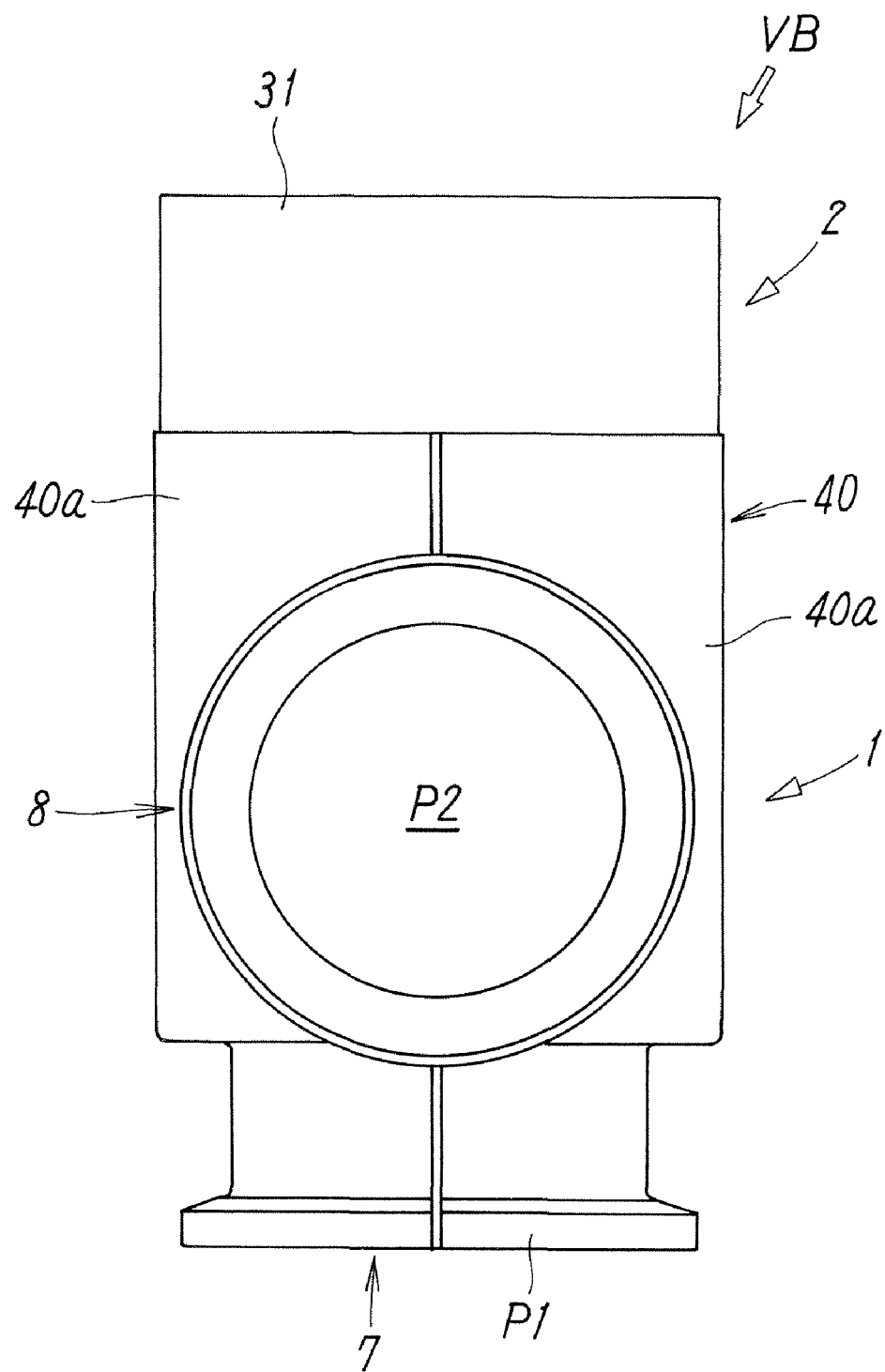
FIG. 9 is a right side elevation of FIG. 8.

In the vacuum valve VB of a second embodiment shown in FIG. 8 and FIG. 9, a jacket 40 for transmitting heat, which is formed from a material having higher thermal conductivity than that of the housing 3 (for example, aluminum), is adhered to an outer surface of the housing 3 in the main valve portion 1 while being in close contact therewith. The jacket 40 is provided so as to prevent a component in the controlling fluid from separating out and adhering to the housing 3, by transmitting the heat from a heater, not shown, to the housing 3 and thereby heating the housing 3.

It is preferable to divide the jacket 40 into a plurality of (for example, two) jacket members 40a and 40a, as shown in FIG. 9, and to detachably attach these jackets 40a to the housing 3. As described above, because of that the jacket 40 is configured to be detachable, a problem, in which the aluminum-made jacket 40 is melted when the housing 3 is rinsed out with hydrofluoric water, is solved by detaching the jacket 40.

The jacket 40 is integrally formed with the supporting seat member 21. However, these jacket 40 and the supporting seat member 21 may separately be formed.

Incidentally, the construction and operation of the second embodiment other than the above-description is identical of that of the vacuum valve VA in the first embodiment explained in FIG. 5 and FIG. 6, and therefore the same numerals are attached to the same main corresponding parts, and the explanation other than the above-description is omitted.

Figure 11:
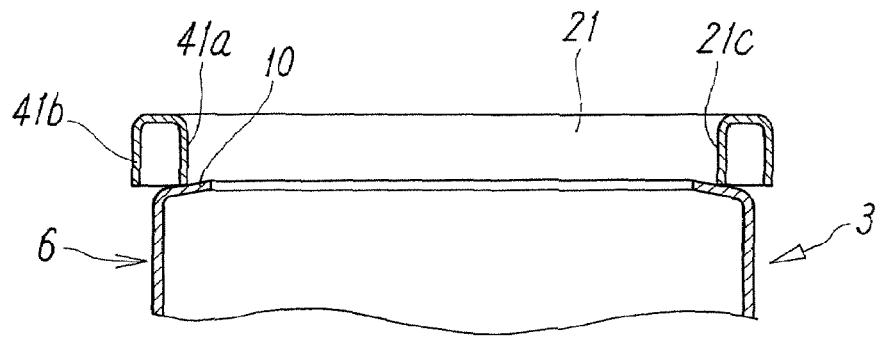
FIG. 11 is a main-part cross-sectional view illustrating another constructional example of the supporting seat member.
Figure 12:
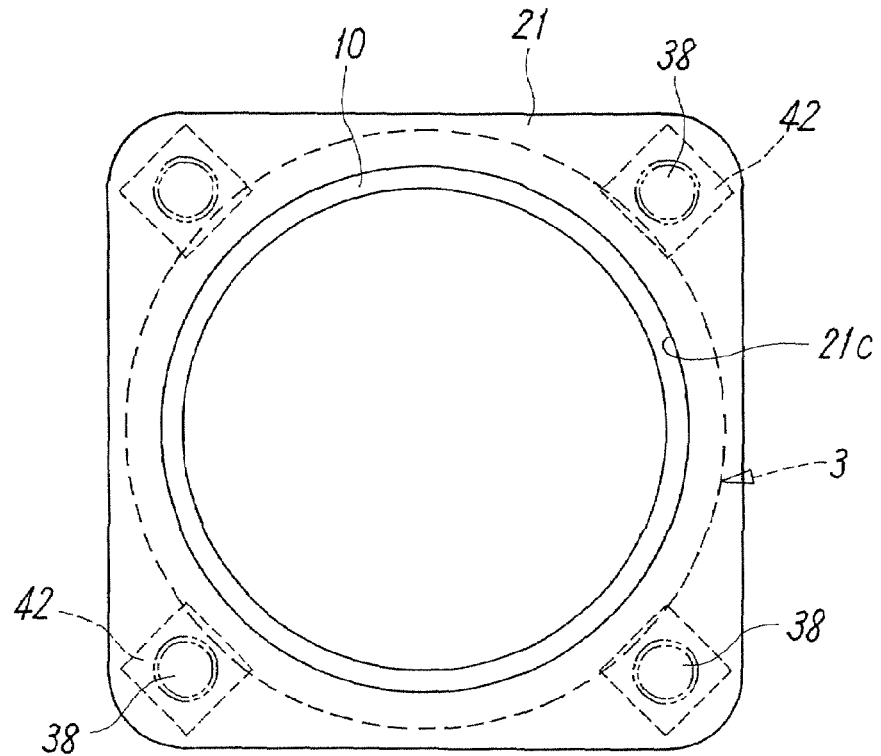
FIG. 12 is a plan view of FIG. 11.

Another constructional example of the supporting seat member 21 is illustrated in FIG. 11 and FIG. 12. The supporting seat member 21 is formed by performing the press-squeezing process for a plate material, for example. The supporting seat member 21 has a groove-shaped cross-sectional shape, and the inner wall 41a is formed to have a round shape and the outer wall 41b is formed to have a rectangular shape. Further, an opening portion of the groove is faced downward, namely faced toward a side of the attaching portion 10 at the upper end of the housing 3, an opening edge of the groove (a tip end of the inner wall 41a) is brought into contact with the attaching portion 10. In this condition, the supporting seat member 21 is fixed to the housing 3 by joining the inner wall 41a with the attaching portion 10 by a method such as an electronic beam welding, laser welding, or the like.

At a portion of each of four corners of the supporting seat member 41 where an interval between the inner wall 41a and the outer wall 41b is formed to be greater, a nut member 42 is fixed to a rear surface of the supporting seat member 41, and the female screw 38 for attaching the operating portion 2 is formed with the nut member 42.

Figure 13:
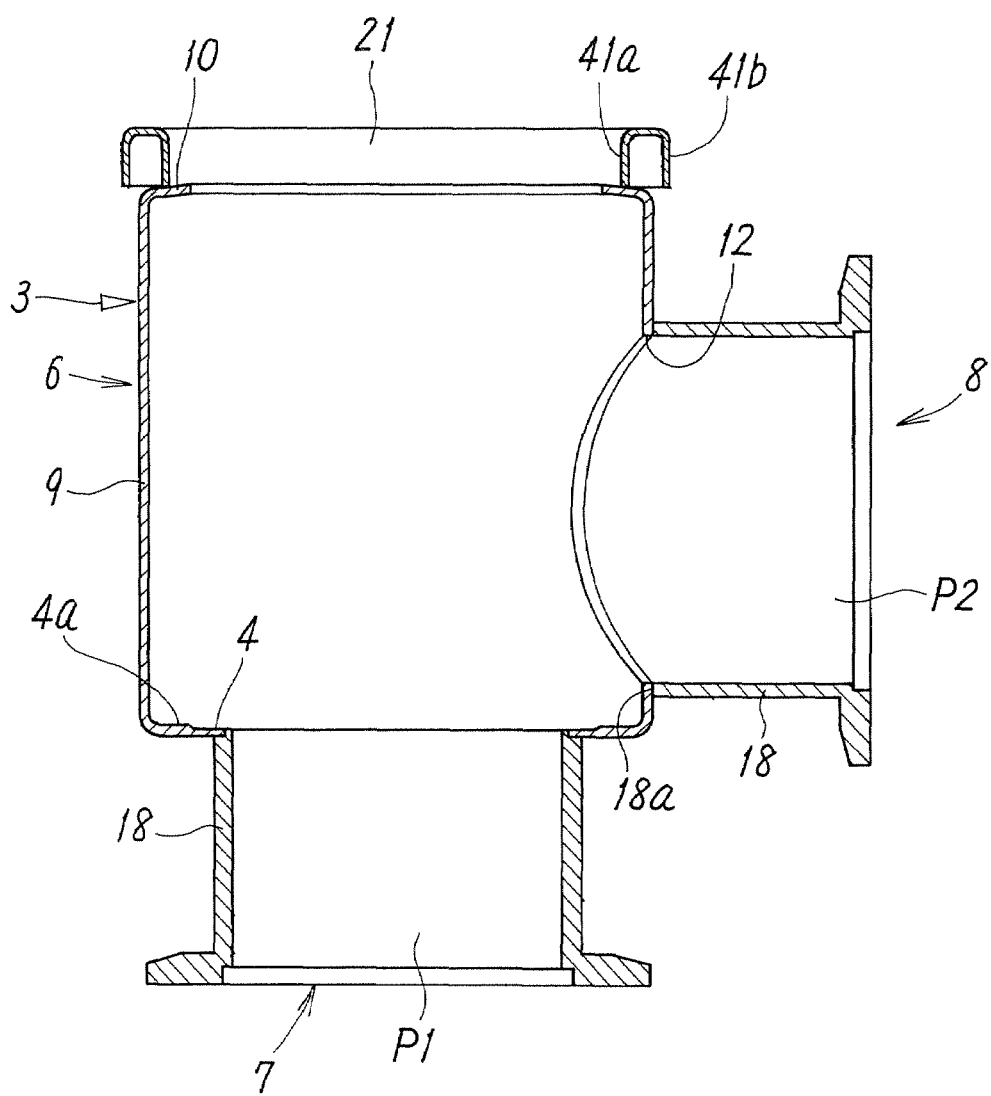
FIG. 13 is a cross-sectional view illustrating a third constructional example of the housing.

In FIG. 13, a third constructional example of the housing 3 is illustrated. A different point of the housing 3 in the third constructional example from the housing 3 in the second constructional example shown in FIG. 3 is a structure of the second port P2. That is, while a cylindrically shaped connecting cylinder portion 12a is formed around the second opening portion 12, and the tip end portion of the cylindrical portion 18 of the port member 8 is confronted to the tip end of the connecting cylinder portion 12a, and the same are joined by welding each other, in the second constructional example, the second opening portion 12 at a side surface of the housing main body 6 is formed into a simple hole, and the joining surface 18a at a tip end of the cylindrical portion 18 of the port member 8 is formed into a curved surface capable of being in close contact with the mouth edge of the second opening portion 12 which is opening in a cylindrical surface, and these contacting portions are joined with each other by welding (two pipes joining), in the housing 3 in the third constructional example.

Further, although the supporting seat member 21 having the same groove shape as that shown in FIG. 11 and FIG. 12 is attached to the attaching portion 10 at the upper end of the housing 3, the supporting seat member 21 may have the shape as shown in FIG. 5.

Since the construction of the housing 3 in the third constructional example other than the above-description is the same as that in the second embodiment, the same numerals are attached to the same main elements, and the explanation is omitted.

The invention claimed is:

1. A vacuum valve, comprising:
   two ports connected to a vacuum chamber and a vacuum source, respectively;
   a valve seat formed in a halfway of a flow path connecting the two ports;
   a main valve portion including a poppet-type valve member contacting and separating from the valve seat that opens and closes the flow path; and
   an operating portion that performs an opening and closing operation of the valve member,
   wherein a housing of the main valve portion includes a cylindrically shaped housing main body having a uniform thickness formed by a press-drawing process or a spinning process for a plate material made of metal or a ring-shaped material made of metal, and includes two cylindrically shaped port members forming the two ports,
   wherein the housing of the main valve portion is assembled by joining each of the two port members with an opening portion for a port formed at each of a first end in an axial direction of the housing main body and a side surface thereof,
   wherein at a second end in the axial direction of the housing main body, a flange-shaped attaching portion having a uniform thickness is formed by inwardly bending the end portion of the housing main body, and a supporting seat member provided with a round inner hole having a diameter greater than an inner diameter of the attaching portion is attached onto the attaching portion,
   wherein the operating portion is attached onto the supporting seat member, and further a ring-shaped sealing member and a ring shaped supporting plate are sandwiched between the attaching portion and the operating portion in an inner hole of the supporting seat member, and
   wherein ends of a bellows are respectively connected to the supporting plate and the valve member.

2. The vacuum valve according to claim 1,
   wherein the supporting seat member is joined with the attaching portion, and a plurality of female screws are formed in the supporting seat member, and
   wherein the operating portion is attached to the supporting seat member by screwing a screw rod provided in the operating portion into each of the plurality of female screws.

3. The vacuum valve according to claim 2, wherein the supporting plate and the housing are formed from the same anticorrosion metallic material.

4. The vacuum valve according to claim 2, wherein the supporting seat member includes a main body portion mounted on an upper surface of the attaching portion, and a skirt portion extending out from an outer peripheral end of the main body portion to a housing side and surrounding an outer periphery of the housing.

5. The vacuum valve according to claim 2, wherein the supporting seat member has a groove-shaped cross-sectional shape, and is attached onto the attaching portion such that an opening edge of the groove contacts the attaching portion.

6. The vacuum valve according to claim 1, wherein the supporting plate and the housing are formed from the same anticorrosion metallic material.

7. The vacuum valve according to claim 1, wherein the supporting seat member includes a main body portion mounted on an upper surface of the attaching portion, and a skirt portion extending out from an outer peripheral end of the main body portion to a housing side and surrounding an outer periphery of the housing.

8. The vacuum valve according to claim 1, wherein the supporting seat member has a groove-shaped cross-sectional shape, and is attached onto the attaching portion such that an opening edge of the groove contacts the attaching portion.

9. The vacuum valve according to claim 1, wherein a jacket for transmitting heat is adhered to an outer surface of the housing of the main valve portion.

10. The vacuum valve according to claim 9, wherein the jacket and the supporting seat member are integrally formed.

11. A housing for use in a main valve portion in a vacuum valve comprising:
    two ports connected to a vacuum chamber and a vacuum source, respectively;
    a valve seat formed in a halfway of a flow path connecting the two ports;
    a main valve portion including a poppet-type valve member that opens and closes the valve seat; and
    an operating portion that performs an opening and closing operation for the valve member,
    wherein the housing includes a cylindrically shaped housing main body having a uniform thickness formed by a press-drawing process or a spinning process for a plate material made of metal or a ring-shaped material made of metal, and includes two cylindrically shaped port members forming the two ports,
    wherein the housing is assembled by joining each of the two port members with an opening portion for a port formed at each of a first end in an axial direction of the housing main body and a side surface thereof,
    wherein at a second end in the axial direction of the housing main body, a flange-shaped attaching portion having a uniform thickness for attaching the operating portion is formed by inwardly bending an end portion of the housing main body, and
    wherein a supporting seat member includes a round inner hole having a diameter greater than an inner diameter of the attaching portion, and a plurality of female screws for attaching the operating portion is fixed onto the attaching portion.

12. The housing for use in a main valve portion according to claim 11, wherein the supporting seat member has a groove-shaped cross-sectional shape, and is fixed to the attaching portion such that an opening edge of the groove contacts the attaching portion.

* * * * *